United States Patent
Gans et al.

(10) Patent No.: US 6,366,588 B1
(45) Date of Patent: Apr. 2, 2002

(54) METHOD AND APPARATUS FOR ACHIEVING DATA RATE VARIABILITY IN ORTHOGONAL SPREAD SPECTRUM COMMUNICATION SYSTEMS

(75) Inventors: Michael James Gans, Holmdel; Laurence Eugene Mailaender, Hoboken; Yu Shuan Yeh, Freehold, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/032,166

(22) Filed: Feb. 27, 1998

(51) Int. Cl.$^7$ .................................................. H04J 3/16
(52) U.S. Cl. ........................ 370/468; 370/206; 370/320; 370/335; 370/342; 375/240; 375/261; 375/268
(58) Field of Search ................................. 370/206, 305, 370/320, 335, 342, 348, 465, 468, 203, 480; 375/240, 261, 298, 146, 147, 148

(56) References Cited

U.S. PATENT DOCUMENTS

| | | | | |
|---|---|---|---|---|
| 4,586,189 A | * | 4/1986 | Tyrrell ......................... | 370/305 |
| 5,280,472 A | * | 1/1994 | Gilhousen et al. .......... | 370/335 |
| 5,414,728 A | * | 5/1995 | Zehaui ........................ | 370/342 |
| 5,537,410 A | * | 7/1996 | Li ................................ | 370/465 |
| 5,619,491 A | * | 4/1997 | Panzer ........................ | 370/342 |
| 5,956,345 A | * | 9/1999 | Allpress et al. ............. | 370/480 |
| 6,041,034 A | * | 3/2000 | Fukumasa et al. .......... | 370/203 |
| 6,188,717 B1 | * | 2/2001 | Kaiser et al. ................ | 375/148 |

OTHER PUBLICATIONS

F. Adachi and M. Sawahashi, Wideband Multi–Rate DS–CDMA for Next Generation Mobile Communication Systems, IEEE 1997 Wireless Communications Conference, pp. 57–62 (1997).

* cited by examiner

*Primary Examiner*—Douglas Olms
*Assistant Examiner*—Shick Hom
(74) *Attorney, Agent, or Firm*—Ryan, Mason & Lewis, LLP

(57) ABSTRACT

A CDMA communication system is disclosed offering a near continuum of data rates up to a maximum rate. The disclosed CDMA communication system increases the data rate variability, without disturbing the orthogonality between users. An increased number of data rates is obtained by time multiplexing the data rates achievable with conventional CDMA systems to provide additional data rates for various multimedia applications. If a user is assigned a specific orthogonal code sequence, such as a Walsh sequence, which permits a maximum data rate, nR, with conventional systems, the user can obtain additional desired data rates up to the maximum rate nR, by time multiplexing the specific orthogonal code set. Desired bit rates are achievable for applications requiring bit rates that are not an integer multiple of the rates provided by conventional techniques. A fundamental rate of R or "fat pipe" rates of powers-of-two multiples of the fundamental rate can be achieved in a conventional manner. A desired rate up to the maximum "fat pipe" rate is achieved by time multiplexing the codes $w_k^n$ to achieve rates between R and nR, where $w_k^n$, denotes the first nth of the spread spectrum code $w_k$. The transmitter of the present invention achieves a rate conversion to match the appropriate codeword to the appropriate data rate, by employing buffering and reclocking of the data, with time multiplexing of the orthogonal Walsh codes corresponding to the available lower and upper rates. The rate conversion must be synchronized with the selection of the orthogonal Walsh code (corresponding to the lower and upper rates).

25 Claims, 7 Drawing Sheets

WALSH CODES $w_0$: 1, 1, 1, 1, 1, 1, 1, 1, 1, 1, 1, 1, 1, 1, 1, 1
$w_1$: 1,-1, 1,-1, 1,-1, 1,-1, 1,-1, 1,-1, 1,-1, 1,-1
$w_2$: 1, 1,-1,-1, 1, 1,-1,-1, 1, 1,-1,-1, 1, 1,-1,-1
$w_3$: 1,-1,-1, 1, 1,-1,-1, 1, 1,-1,-1, 1, 1,-1,-1, 1
$w_4$: 1, 1, 1, 1,-1,-1,-1,-1, 1, 1, 1, 1,-1,-1,-1,-1
$w_5$: 1,-1, 1,-1,-1, 1,-1, 1, 1,-1, 1,-1,-1, 1,-1, 1
$w_6$: 1, 1,-1,-1,-1,-1, 1, 1, 1, 1,-1,-1,-1,-1, 1, 1
$w_7$: 1,-1,-1, 1,-1, 1, 1,-1, 1,-1,-1, 1,-1, 1, 1,-1
$w_8$: 1, 1, 1, 1, 1, 1, 1, 1,-1,-1,-1,-1,-1,-1,-1,-1
$w_9$: 1,-1, 1,-1, 1,-1, 1,-1,-1, 1,-1, 1,-1, 1,-1, 1
$w_{10}$: 1, 1,-1,-1, 1, 1,-1,-1,-1,-1, 1, 1,-1,-1, 1, 1
$w_{11}$: 1,-1,-1, 1, 1,-1,-1, 1,-1, 1, 1,-1,-1, 1, 1,-1
$w_{12}$: 1, 1, 1, 1,-1,-1,-1,-1,-1,-1,-1,-1, 1, 1, 1, 1
$w_{13}$: 1,-1, 1,-1,-1, 1,-1, 1,-1, 1,-1, 1, 1,-1, 1,-1
$w_{14}$: 1, 1,-1,-1,-1,-1, 1, 1,-1,-1, 1, 1, 1, 1,-1,-1
$w_{15}$: 1,-1,-1, 1,-1, 1, 1,-1,-1, 1, 1,-1, 1,-1,-1, 1

FIG. 2

METHOD AND APPARATUS FOR ACHIEVING DATA RATE VARIABILITY IN ORTHOGONAL SPREAD SPECTRUM COMMUNICATION SYSTEMS

FIELD OF THE INVENTION

The present invention relates to cellular and other communication systems, and more particularly, to methods and apparatus for achieving additional data rates in communication systems utilizing code division multiple access (CDMA).

BACKGROUND OF THE INVENTION

When multiple users share a transmission medium, some form of multiplexing is required to provide separable user sub-channels. There are many multiplexing techniques available which simultaneously transmit information signals within the available bandwidth, while still maintaining the quality and intelligibility that are required for a given application. Code division multiple access (CDMA) techniques, for example, transmit multiple information signals on the same channel, and differentiate each user sub-channel by encoding it with a unique spreading code.

Code division multiple access (CDMA) techniques have been employed in many digital wireless communication systems to permit a large number of system users to communicate with one another. Current CDMA networks were designed to carry only voice traffic and exhibit limited data rate variability. CDMA networks, however, must evolve to encompass a variety of multimedia applications, each having potentially different data rates. Thus, CDMA networks will be required to carry information associated with the various multimedia applications at various data rates, corresponding to the requirements of diverse wireless services demanded by customers.

Many communication systems utilizing code division multiple access (CDMA) comply with the IS-95 standard, adopted by the Telecommunication Industry Association (TIA). Under the IS-95 standard, a communication system substantially eliminates co-channel interference and improves the bit energy-to-noise density ratio, $E_b/N_o$, on the forward link from a base station or cell site to a mobile receiver unit by modulating the information signals with Walsh orthogonal function sequences. To produce corresponding orthogonal information signals, these CDMA systems require that the forward link information signals be transmitted in a synchronized manner.

A more detailed discussion of the IS-95 standard is provided in "Mobile Station-Base Station Compatibility Standard for Dual-Mode Wideband Spread Spectrum Cellular System," Telecommunication Industry Association Doc. No. TIA/EIA/IS-95 (1993)[, incorporated by reference herein]. The document TIA/EIA/IS-95 (1993) may be obtained, for example, using the following Internet reference: http://www.tiaonline.org/standards/search_n_order.

Current implementations of the IS-95 standard, however, allow only a limited number of data rates. Specifically, the Telecommunication Industry Association has recently adopted a new standard, IS-95B, for increasing the data rates that may be achieved with CDMA networks. The IS-95B standard, however, only permits data rates that are integer or power-of-two multiples of the basic CDMA rate. While such techniques satisfy the data rate needs of many applications, the utility of CDMA networks could be significantly extended if further data rate variability could be achieved.

SUMMARY OF THE INVENTION

Generally, a CDMA communication system offering a near continuum of data rates up to a maximum rate is disclosed. The disclosed CDMA communication system increases the data rate variability, without disturbing the orthogonality between users. An increased number of data rates is obtained by time multiplexing the data rates achievable with conventional CDMA systems to provide additional data rates for various multimedia applications.

In accordance with one feature of the present invention, if a user is assigned a specific orthogonal code sequence, such as a Walsh sequence, which permits a nominal data rate, R, and higher data rates, nR, the user can obtain additional desired data rates by time multiplexing the specific orthogonal code set. In this manner, desired bit rates are provided for applications requiring bit rates that are not an integer multiple of the rates provided by conventional "fat pipe" techniques.

In an illustrative sixteen dimension implementation, if a specific code quadruple, such as the code quadruple ($w_k$, $w_{k+4}$, $w_{k+8}$, $w_{k+12}$) (k=0, 1, 2, 3), is assigned to an information source, any rate can be achieved, up to a rate of 4R. Rates R, 2R, 4R and 16R can be achieved by assigning other appropriate code sets to the information source, in a conventional manner. According to a feature of the invention, any desired rate up to 4R is achieved by time multiplexing the codes $w_k$, $w_k^2$ and $w_k^4$. The symbol, $w_k^n$, denotes the first nth of the spread spectrum code $w_k$ (hence, n=2 denotes the first half of the sequence). Thus, the user can achieve any data rate that is a rational scale factor combination of the rates R and 4R.

The transmitter of the present invention achieves a rate conversion to match the appropriate codeword to the appropriate data rate, by employing buffering and reclocking of the data, with time multiplexing of the orthogonal Walsh codes corresponding to the available lower and upper rates. The rate conversion must be synchronized with the selection of the orthogonal Walsh code (corresponding to the lower and upper rates). For example, an application requiring a data rate between 2R and 4R, such as 2.3R, would require multiplexing of the 2R and 4R Walsh codes ($w_k^2$ and $w_k^4$) to achieve the desired 2.3R rate. If the 2.3R application was assigned the specific code quadruple ($w_1$, $w_5$, $w_9$, $w_{13}$) the sequence $w_1^2$ is utilized to achieve a rate of 2R and the sequence $w_1^4$ is utilized to achieve a rate of 4R, with an appropriate balance to achieve an overall 2.3R rate, and the codes $w_5$, $w_9$, $w_{13}$ are excluded from use.

BRIEF DESCRIPTION OF THE DRAWINGS

FIG. 2 is a table of an illustrative set of orthogonal spread spectrum codes, $w_0$ through $w_{15}$;

DETAILED DESCRIPTION

The present invention relates to a method and apparatus for modulating a communication signal in a code division multiple access (CDMA) environment using orthogonal spread spectrum codes. As discussed further below in conjunction with FIGS. 1 through 3, conventional CDMA spread spectrum modulation techniques with orthogonal codes only permit data rates that are integer or power-of-two multiples of the chip rate. The present invention improves on conventional CDMA spread spectrum modulation techniques by time multiplexing the data rates achievable with conventional CDMA systems to provide additional data rates for various multimedia applications. In one preferred embodiment, a continuum of data rates are provided.

As previously indicated, it is often desirable to differentiate a number of information signals transmitted on the same carrier frequency with unique orthogonal spread spectrum codes. This is typically accomplished by encoding each bit to be transmitted using a predefined codeword, or pattern, consisting of n "chips" or "signal elements." In standard antipodal encoding, the predefined codeword may be utilized to represent a value of binary "0" and the inverse of the predefined codeword may be utilized to represent a value of binary "1."

A number of orthogonal spread spectrum codes, consisting of a number of consecutive positive and negative signal elements, such as Walsh codes, have been discovered which have unique properties that optimize the detection of the transmitted information. Under the IS-95 standard for CDMA networks, for example, sixty four different Walsh codewords, $w_0$ through $w_{63}$, each consisting of sixty four chips, permit 64 different information signals to be transmitted on the same carrier frequency. Since a number of channels are reserved for administration, such as the pilot, synch and paging channels, less than the available sixty four channels typically transmit user information.

Figure 1:
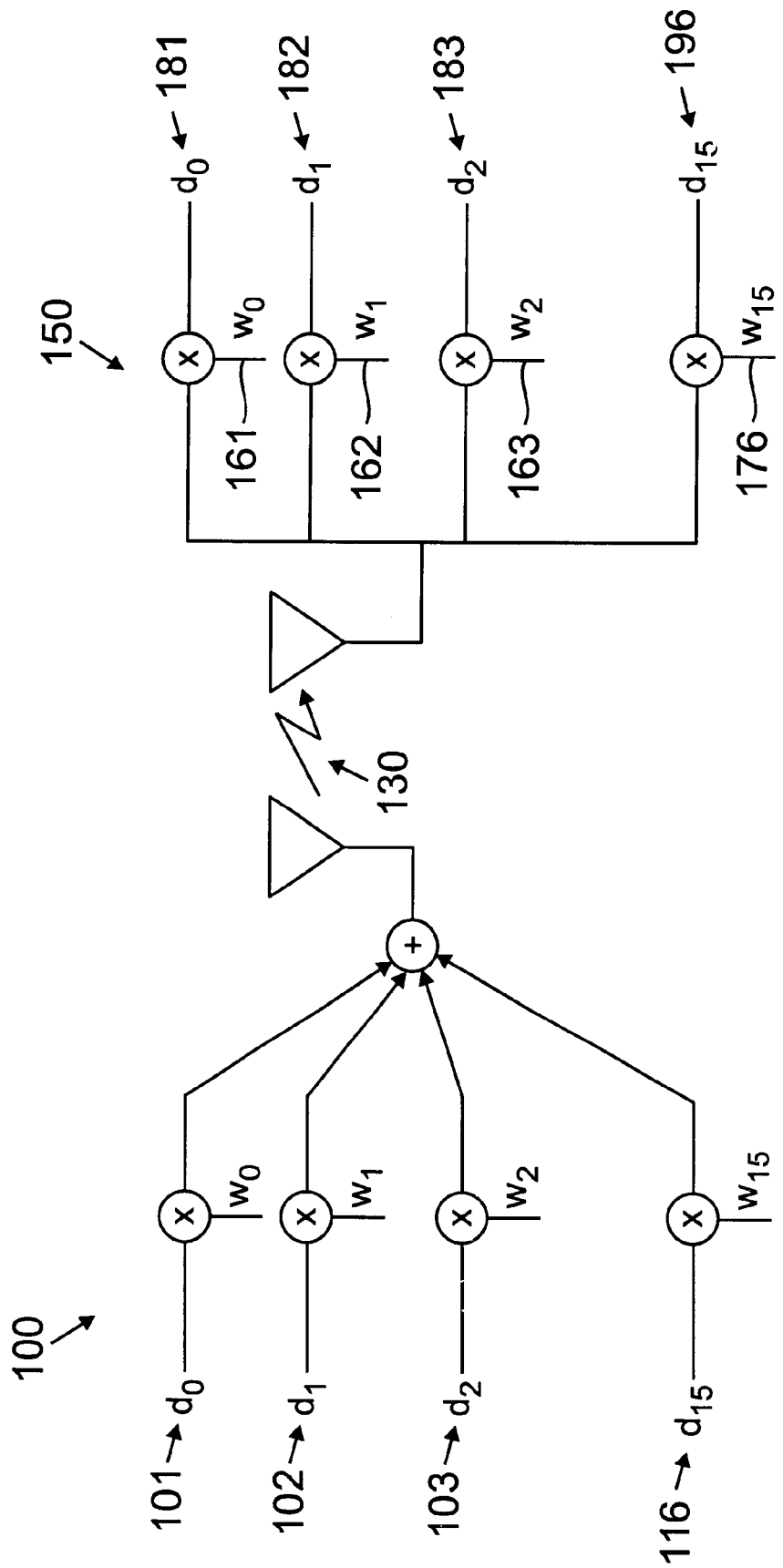
FIG. 1 is a block diagram of a conventional CDMA transmitter that provides user streams (or sub-channels) at a single data rate.

In the illustrative embodiment discussed herein, sixteen different Walsh codewords, $w_0$ through $w_{15}$, each consisting of sixteen chips, permit up to sixteen different information signals, $d_0$ through $d_{15}$, to be transmitted on the same carrier frequency. Thus, as shown in FIG. 1, in order to transmit data on the downlink portion of a conventional CDMA system from one or more information sources, such as sources 101–116, to a plurality of end users, such as end users 181–196, a transmitter 100 encodes each of sixteen data streams, $d_0$ through $d_{15}$, to be transmitted using one of sixteen different Walsh codewords, $w_0$ through $w_{15}$. The illustrative Walsh codewords, $w_0$ through $w_{15}$, are shown in FIG. 2. The encoded signals will then be combined and modulated in a conventional manner, prior to transmission over a transmission medium 130. The transmission medium 130 may be embodied as a conventional or wireless communications network. The modulator may employ a modulation technique, for example, which multiplies the codeword by a sinusoidal carrier wave in order to shift the signal frequency upward to the carrier frequency (not shown). In this manner, the original signal spectrum may be translated into a particular frequency band allocated by the Federal Communications Commission (FCC) or another regulatory body.

Upon receipt of the transmitted signal by the receiver 150, the frequency of the received signal is typically first shifted down (not shown) to the base band by a demodulator, thus returning the signal to its original form prior to modulation. Thereafter, the received signal is passed through a series of filters, such as filters 161–176, that are each matched to the characteristics of the appropriate codeword, $w_0$ through $w_{15}$. It is noted that the receiver 150 may be associated with all sixteen end users 181 through 196, as shown in FIG. 1. More typically, however, each end user, such as end user 181, will have its own receiver 150. For a more detailed discussion of a prior art CDMA communication system, see U.S. Pat. No. 4,901,307, incorporated by reference herein.

Figure 3:
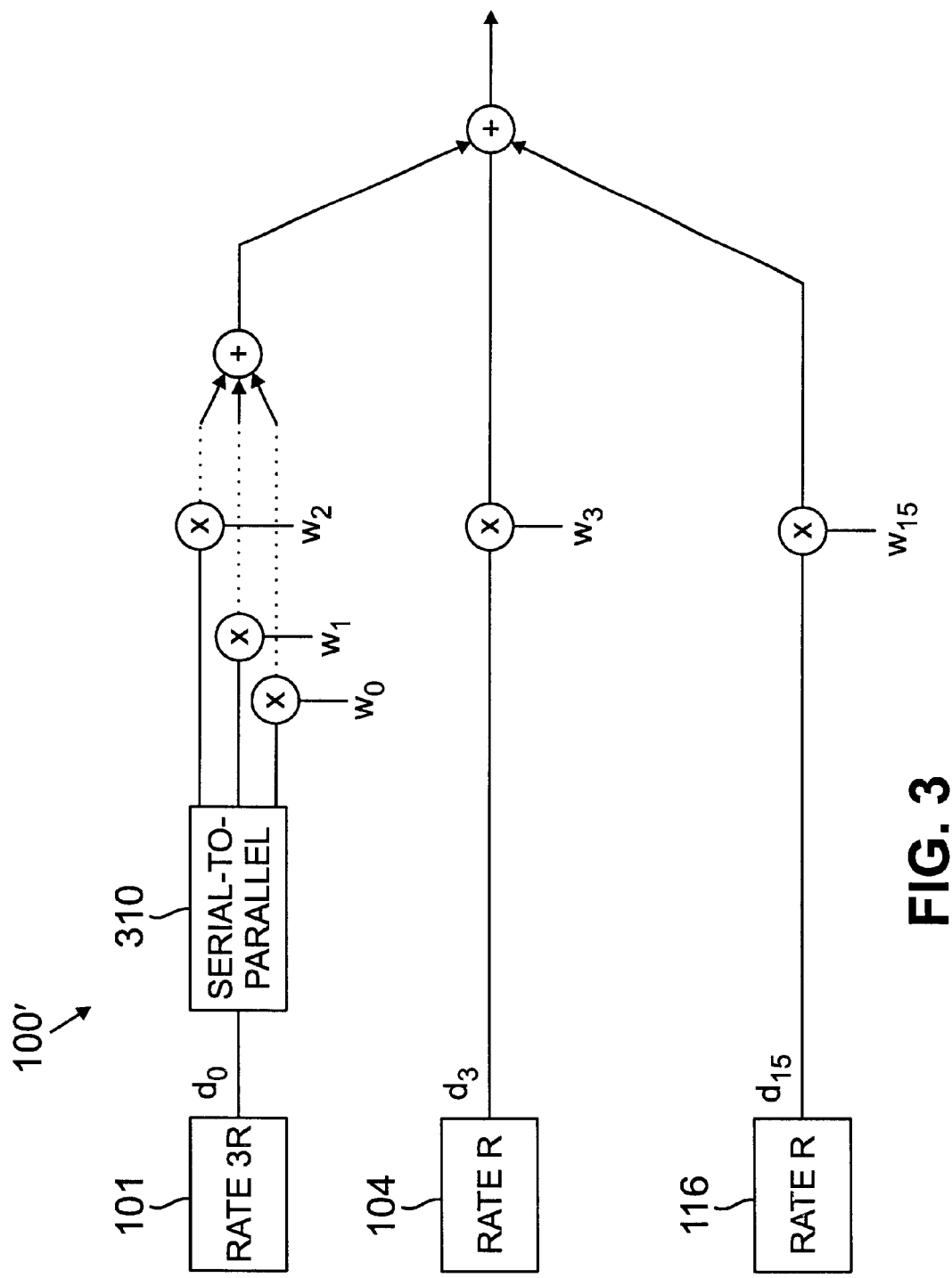
FIG. 3 is a block diagram of a conventional CDMA transmitter that provides at least one information signal at an integer multiple of the data rate of FIG. 1.

For the transmitter 100 shown in FIG. 1, each of the information sources 101–116 transmits at a uniform rate, R, and the symbol duration is equal to the Walsh code duration. Additional data rate variability can be achieved within the implementation shown in FIG. 1, by assigning multiple orthogonal spread spectrum codes, such as Walsh codes, to the same high rate information source, such as the source 101. For example, in order to achieve a transmission rate, such as 3R, for a single source 101, three Walsh codewords (sub-channels) can be assigned to the information source 101. Thus, the set of achievable data rates are integer multiples of the symbol rate, R. As shown in FIG. 3, multicode source 101 will require additional buffering, typically in the form of a serial-to-parallel converter 310. It is noted that the transmitter 100' shown in FIG. 3 can combine any of the sixteen sub-channels associated with the codewords, $w_0$ through $w_{15}$, to increase the data rate for a single information source 101 to a maximum of 16R.

Figure 4:
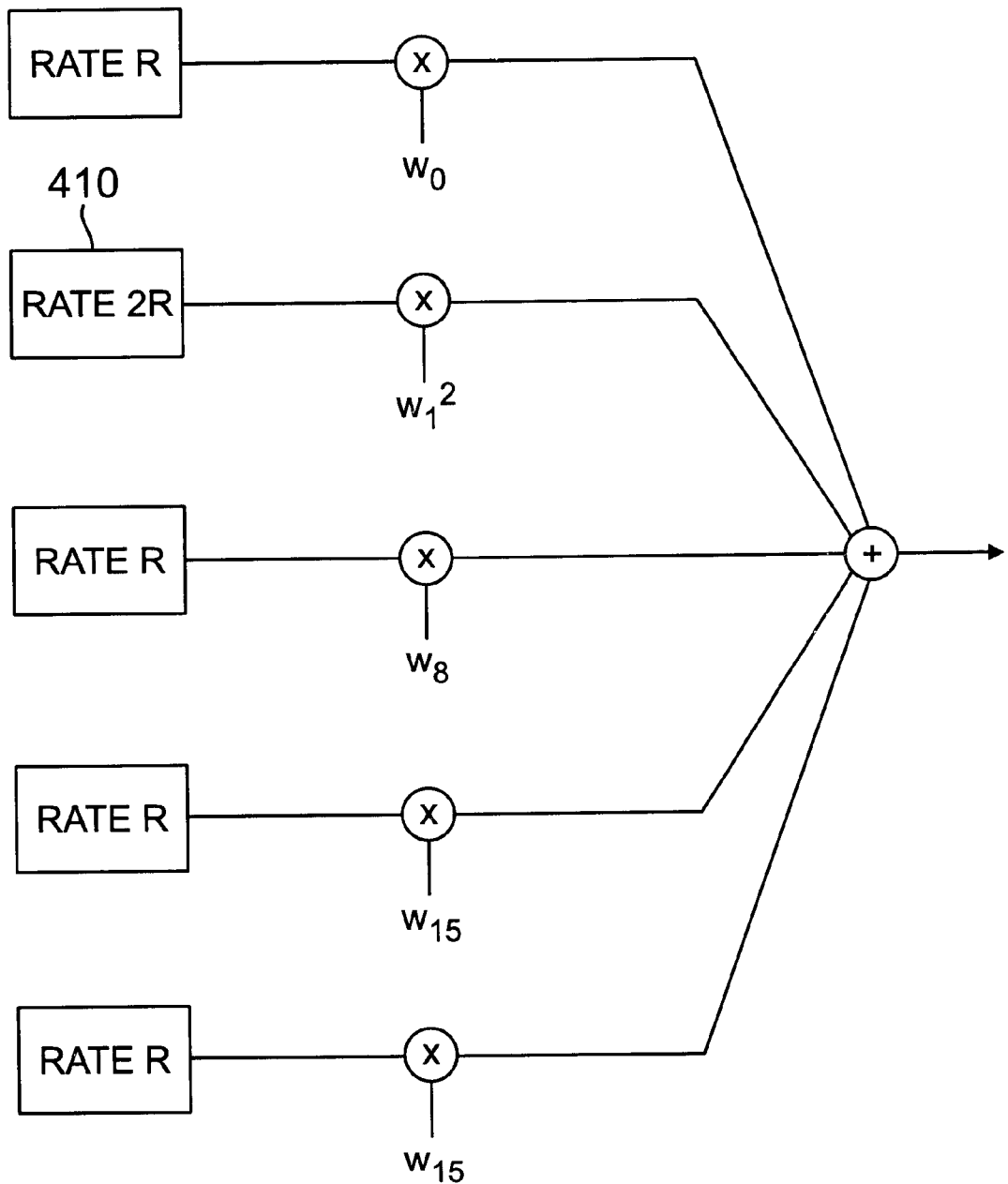
FIG. 4 is a block diagram of a conventional CDMA transmitter that provides at least one information signal at two times the data rate of FIG. 1.

A second well-known method for increasing the transmission rate in a code division multiple access (CDMA) network, commonly referred to as the "fat pipe" method, "punctures" the set of illustrative Walsh codes shown in FIG. 2. As discussed below, the "fat pipe" method achieves data rates that are power-of-two multiples of the chip rate, without requiring buffering of the multiple rate user. In other words, the achievable data rates are R, 2R, 4R, 8R and 16R (for the illustrative 16 dimensional Walsh codes shown in FIG. 2). Specific code pairs, such as the code pairs ($w_0$, $w_8$) or ($w_1$, $w_9$), are assigned to the double rate users, transmitting at rate 2R. Each double rate user, however, will encode data with only the first half of one of the assigned orthogonal spread spectrum codes. The symbol, $w_k^2$, denotes the first half of the spread spectrum code $w_k$ shown in FIG. 2. Thus, as shown in FIG. 4, for the spread spectrum code pair, ($w_1$, $w_9$) assigned to the information source 410, $w_1^2$ is utilized to encode data at a rate of 2R, and $w_9$ is excluded from use by all information sources. It is noted that for each pair ($w_k$, $w_{k+8}$), $w_{k+8}^2 = w_k^2$, and the second half of the spread spectrum code $w_{k+8}$ is the opposite polarity of the spread spectrum code $w_k$.

Figure 5:
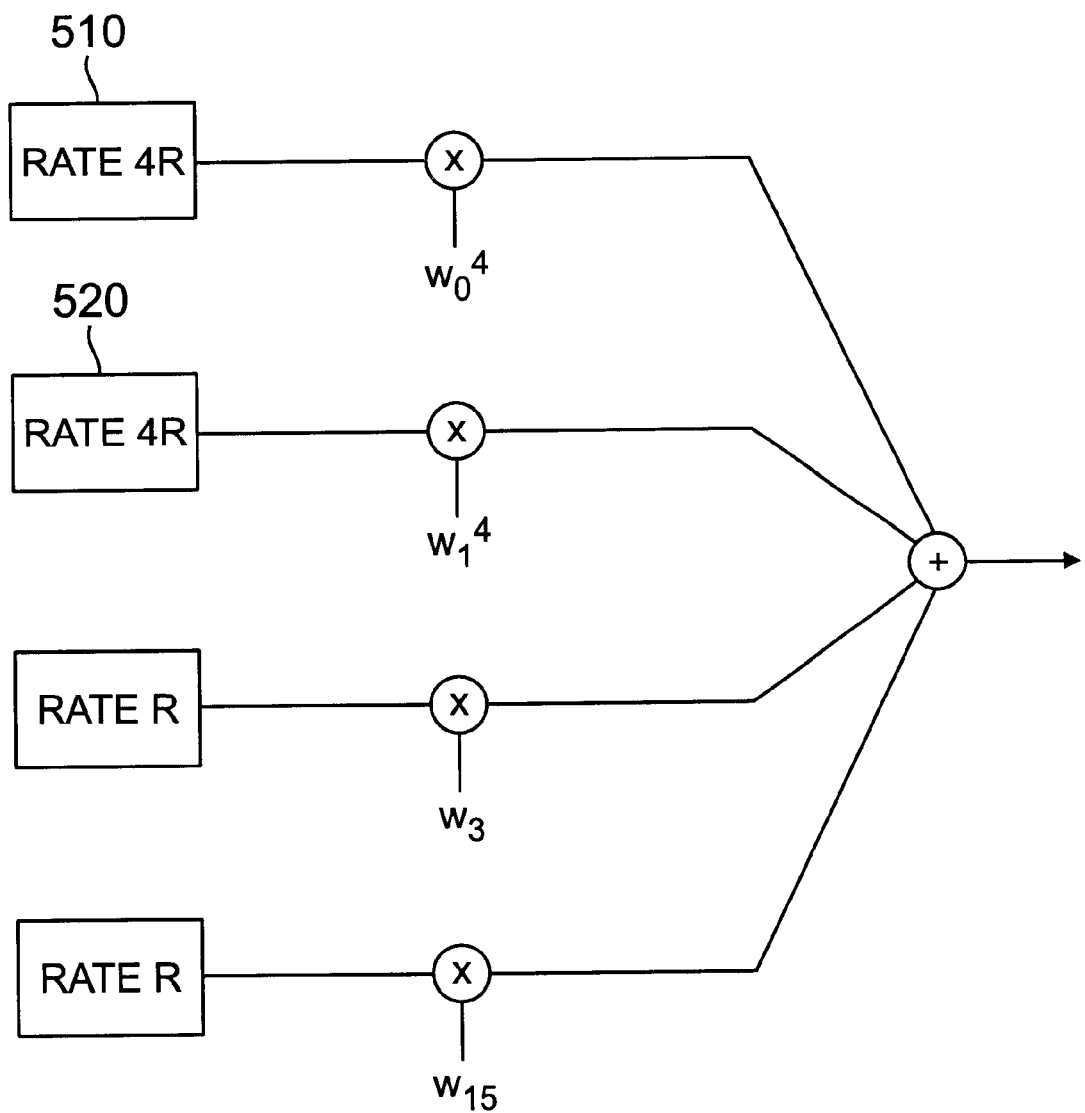
FIG. 5 is a block diagram of a conventional CDMA transmitter that transmits at least one information signal at four times the data rate of FIG. 1.

Likewise, specific code quadruples, such as the code quadruples ($w_0$, $w_4$, $w_8$, $w_{12}$) or ($W_1$, $w_5$, $w_9$, $w_{13}$), are assigned to each quadruple rate user, transmitting at a rate 4R. Thus, as shown in FIG. 5, for the orthogonal spread spectrum code quadruple ($w_0$, $w_4$, $w_8$, $w_{12}$) assigned to an information source 510, $w_0$ is utilized to encode data and $w_4$, $w_8$, and $w_{12}$ are excluded from use by all information sources. Similarly, for the spread spectrum code quadruple ($w_1$, $w_5$, $w_9$, $w_{13}$) assigned to an information source 520, $w_1$ is utilized to encode data and $w_5$, $w_9$ and $w_{13}$ are excluded from use by all information sources. The symbol, $w_k^4$, denotes the first quarter of the spread spectrum code $w_k$ shown in FIG. 2. It is noted that for each code quadruple ($w_k$, $w_{k+4}$, $w_{k+8}$, $w_{k+12}$), $w_{k+12}^4 = w_{k+8}^4 = w_{k+4}^4 = w_k^4$, and the last three-quarters of each spread spectrum code $w_{k+4}$, $w_{k+8}$, $w_{k+12}$ is the same or opposite polarity of the spread spectrum code $w_k$. It is further noted that the "fat pipe" method does not require buffering of the higher rate users, the codes are not summed, and the signal's peak-to-average ratio is not increased.

According to a feature of the present invention, additional data rates are achieved while maintaining the orthogonal signal structure discussed above for conventional code division multiple access (CDMA) transmitters. In accordance with the present invention, if a user is assigned a specific code set in the manner described above, which permits a maximum data rate nR, the user can obtain additional desired data rates up to the maximum rate nR, by time multiplexing the specific code set. In order to achieve a non-integer rate with conventional systems, however, such as a rate of 2.3R, conventional techniques would require "dummy" data, such as all zeros, to be added to the transmitted stream to bring the presented rate up to the next greatest available "fat pipe" rate, such as 4R. Thus, the present invention provides desired bit rates for applications that have a bit rate that is not an integer multiple of the rates provided by the "fat pipe" technique discussed above.

For example, if a specific code quadruple, $(w_k, w_{k+4}, w_{k+8}, w_{k+12})$ (k=0, 1, 2, 3), is assigned to an information source 610, any rate can be achieved, up to a rate of 4R. While the user can achieve a fundamental rate of R in the manner described above in conjunction with FIG. 1 by employing the spread spectrum code $w_0$, a "fat pipe" rate of 2R in the manner described above in conjunction with FIG. 4 by employing the spread spectrum code $w_0^2$, or a "fat pipe" rate of 4R in the manner described above in conjunction with FIG. 5 by employing the spread spectrum code $w_0^4$ in the present invention, the user can achieve desired additional lower rates by time multiplexing the codes $w_0$, $w_0^2$ and $w_0^4$, to achieve rates between R and 4R. In other words, the user can achieve any data rate that is a rational scale factor combination of the rates R and 4R.

Figure 6:
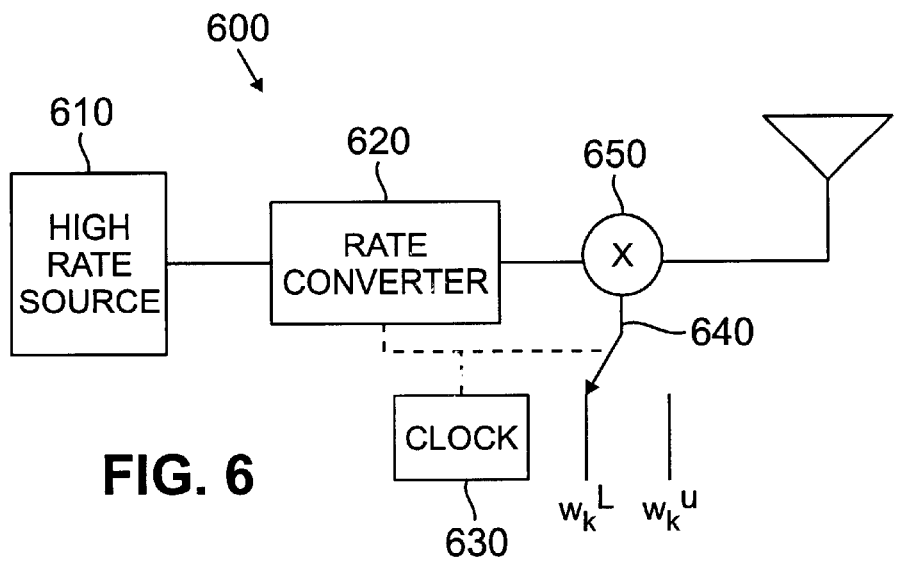
FIG. 6 is a block diagram of one sub-channel of a CDMA transmitter offering data rate variability in accordance with one embodiment of the present invention.

As shown in FIG. 6, the transmitter 600 of the present invention achieves a rate conversion by employing buffering and reclocking of the data, with time multiplexing of the orthogonal Walsh codes corresponding to the available lower and upper rates. As discussed further below, the rate conversion must be synchronized with the selection of the orthogonal Walsh code (corresponding to the lower and upper rates). For example, the illustrative 2.3R application would require multiplexing of the 2R and 4R Walsh codes to achieve the desired 2.3R rate. If the 2.3R application was assigned the specific code quadruple $(w_1, w_5, w_9, w_{13})$, the sequence $w_1^4$ is utilized to achieve a rate of 4R, and the codes $w_5, w_9, w_{13}$ are excluded from use.

Thus, when the high rate service is requested, by either the mobile terminal (end user) or the base station (information source), the sync channel (or another administration channel) is preferably utilized to coordinate the wireless service. The originating entity will send a message either requesting or confirming the rate, as well as the particular codes desired. For example, if the mobile terminal requests a channel having a 2.3R rate, the base station will grant or deny the request, and supply the assigned sequences, if available. In one preferred embodiment, the base station will supply the mobile terminal with the assigned sequences, as well as the amount of data that should be transmitted at each of the lower and upper rates. Thus, the sync channel protocol may consist of a message containing a user identifier (indicating, for example, the mobile terminal), a sequence number (indicating the particular Walsh code, $w_0$ though $w_{15}$, to utilize), the number of repetitions, $N_L$ and $N_U$, and the rate exponents, $R_L$ and $R_U$, for the lower and upper rates, respectively (such as 2R, 4R, or 8R). Thus, from the sequence number and the upper rate, $R_U$, the mobile terminal knows which other sequences must be excluded.

The number of repetitions, $N_L$ and $N_U$, is the number of symbols to transmit at each of the lower and upper rates, respectively. The number of repetitions is determined by the following equation:

$$R_{final} = \left(\frac{R_L R_U (N_L + N_U)}{N_L R_U + N_U R_L}\right) R$$

where $R_{final}$ is the desired rate to be achieved and R is the fundamental rate. Thus, to achieve a desired rate of 2.3R, $R_L=2$ and $R_H=4$, one solution is $N_L=17$ and $N_U=6$. One method for determining this solution recognizes that 2.3 can be written as a ratio of the integers 23 and 10. Writing $R_{final}$ as this ratio, and using the above equation, leads to a system of linear equations:

$4N_L+4N_U=23n$ $2N_L+N_U=10n$, where n is an arbitrary integer. These equations can be solved repeatedly for n=1, 2, 3, ..., until a solution is found for which $N_L$ and $N_U$ are both integers.

Thus, as shown in FIG. 6, the transmitter 600 of the present invention includes a rate converter 620 and a clock 630 to buffer and reclock the data, respectively, received from a high rate source 610. The rate converter 620 must be synchronized with the selection of the orthogonal Walsh code (corresponding to the lower and upper rates), $w_k^L$ and $w_k^U$, by a switch 640. The output of the rate converter 620 exhibits two different bit durations, and the Walsh codes, $w_k^L$ and $w_k^U$, are used accordingly to multiply the data by a multiplier 650. Thus, the information source has been matched to the existing fat pipe rates.

Figure 7:
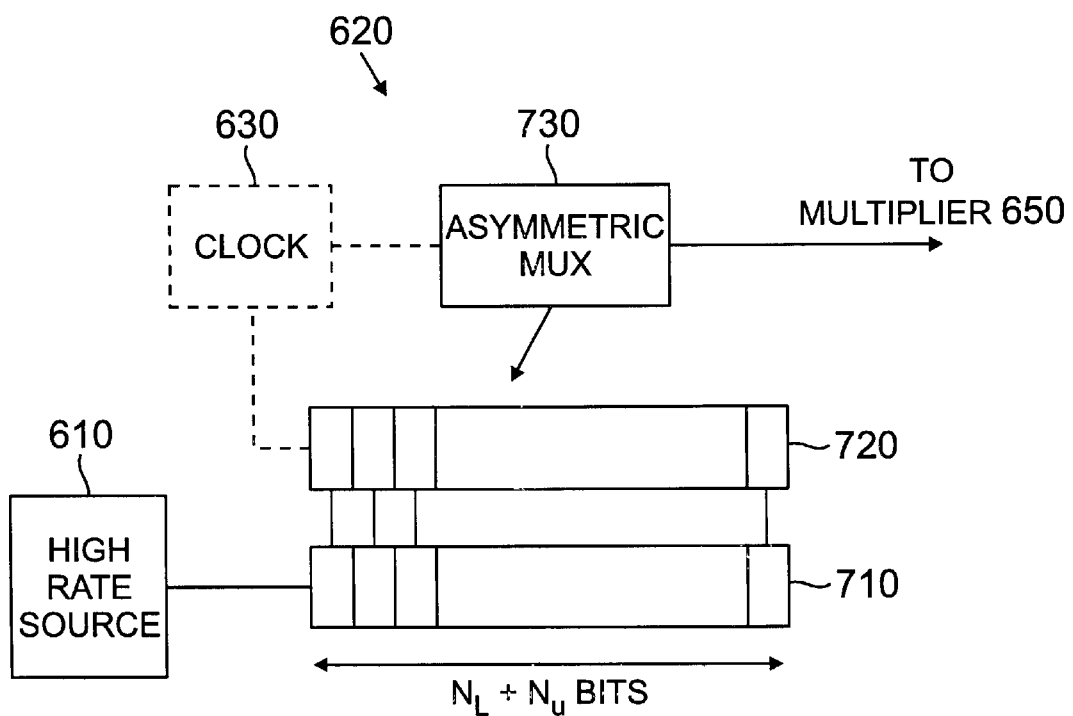
FIG. 7 is a block diagram of one embodiment of the rate converter of FIG. 6.

FIG. 7 illustrates one implementation of the rate converter 620. Thus, the rate converter 620 includes two buffers 710 and 720. The first buffer 710 fills with data at a constant rate, and the second buffer 720 is read by an asymmetric multiplexer 730 for every ($N_L+N_U$) bits. Thus, for the 2.3R example discussed above, 17 bits ($N_L$) are read out of the buffer 720 at a rate of 2R ($R_L$) and the last 6 bits ($N_U$) are read out of the buffer 720 at a rate of 4R ($R_U$) Thus, the clock at the input of the buffer 710 is symmetric (evenly spaced), while the clock at the output of the asymmetric buffer 720 is asymmetric. The clock 630 controls the buffer 720, the asymmetric multiplexer 730 and the selection of the Walsh code by the switch 640 for the multiplier 650.

Figure 8:
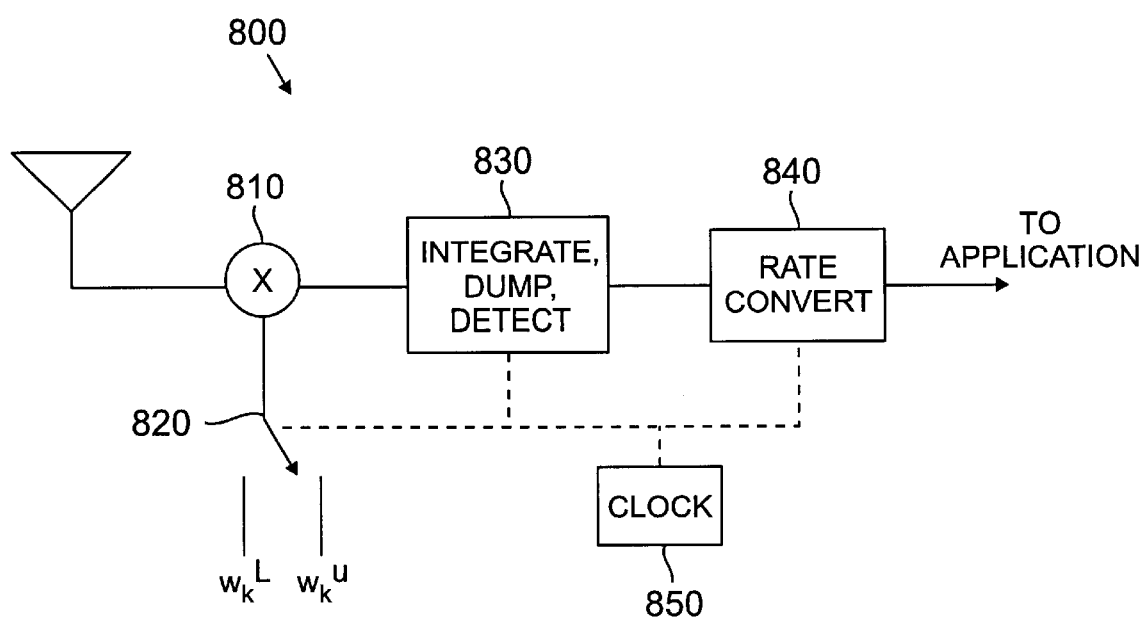
FIG. 8 is a block diagram of a CDMA receiver offering data rate variability in accordance with one embodiment of the present invention.

FIG. 8 illustrates one implementation of a receiver 800 in accordance with the present invention. The receiver 800 includes a multiplier 810, which selectively multiplies the received data by the appropriate Walsh code, as selected by a switch 820, an integrate, dump, detect block 830 for determining the received bit polarities, a rate converter 840 and a clock 850. The rate converter 840 operates in a similar manner to the rate converter 620, discussed above in conjunction with FIGS. 6 and 7. The selection of the low rate or upper rate Walsh waveform at the multiplier 810 is tied to the integrator 830 and the input clock of the rate converter 840. In the receiver 800, the input clock of the rate converter 840 is asymmetric while the output clock is symmetric.

It is to be understood that the embodiments and variations shown and described herein are merely illustrative of the principles of this invention and that various modifications may be implemented by those skilled in the art without departing from the scope and spirit of the invention.

We claim:

1. A method of transmitting spread spectrum signals in a communication system, said method comprising the steps of:
   encoding a data signal with a first and a second orthogonal function sequence to form a combined spread signal, wherein said first orthogonal function produces a first spread signal at a first rate and said second orthogonal function produces a second spread signal at a second rate different from said first rate; and
   combining said first and second spread signal to produce said combined spread signal having a data rate between said first and second rates.

2. The method according to claim 1, wherein said combining step further comprises the step of converting the rate of said data signal to said first and second rates.

3. The method according to claim 2, wherein said converting step consists of buffering and reclocking said data signal and time multiplexing said first and second orthogonal function sequences corresponding to said first and second rates.

4. The method according to claim 1, further comprising the step of transmitting with said combined spread signal an indication of said first and second orthogonal function sequences, said first and second rates and the amount of data transmitted at each of said first and second rates.

5. A spread spectrum communication system for transmitting a data signal comprising:
   an orthogonal function encoder that combines said data signal with at least a first and a second orthogonal function sequence to form a combined spread signal, wherein said first orthogonal function produces a first spread signal at a first rate and said second orthogonal function produces a second spread signal at a second rate different from said first rate; and
   means for combining said first and second spread signal to produce said combined spread signal having a data rate between said first and second rates.

6. The communication system according to claim 5, wherein said orthogonal function encoder converts the rate of said data signal to said first and second rates.

7. The communication system according to claim 6, wherein said orthogonal function encoder includes a rate converter for buffering and reclocking said data signal and time multiplexing said first and second orthogonal function sequences corresponding to said first and second rates.

8. The communication system according to claim 5, further comprising means for transmitting with said combined spread signal an indication of said first and second orthogonal function sequences, said first and second rates and the amount of data transmitted at each of said first and second rates.

9. A method for receiving a spread spectrum signal at a transmission rate in a communication system comprising:
   decoding said received spread spectrum signal with at least a first and a second orthogonal function sequence to produce a combined digital signal, wherein said first orthogonal function sequence produces a first digital signal at a first rate and said second orthogonal function sequence produces a second digital signal at a second rate different from said first rate, wherein said transmission rate is between said first rate and said second rate; and
   detecting a data signal in said combined digital signal.

10. The method according to claim 9, wherein said decoding step further comprises the step of converting the rate of said data signal to said first and second rates.

11. The method according to claim 10, wherein said converting step consists of buffering and reclocking said data signal and time multiplexing said first and second orthogonal function sequences corresponding to said first and second rates.

12. The method according to claim 9, further comprising the step of receiving with said received spread spectrum signal an indication of said first and second orthogonal function sequences, said first and second rates and the amount of data transmitted at each of said first and second rates.

13. A method of transmitting a data signal in a spread spectrum communication system, said method comprising the steps of:
   encoding a portion of said data signal with a first orthogonal function sequence to form a first spread signal at a first rate;
   encoding a remaining portion of said data signal with a second orthogonal function sequence to form a second spread signal at a second rate different from said first rate; and
   time multiplexing said first and second spread signals to achieve a combined spread signal at a desired rate between said first rate and said second rate.

14. The method according to claim 13, wherein said encoding steps further comprise the step of converting the rate of said portion of said data signal and said remaining portion of said data signal to said first and second rates.

15. The method according to claim 14, wherein said converting steps consist of buffering and reclocking said data signal and time multiplexing said first and second orthogonal function sequences corresponding to said first and second rates.

16. The method according to claim 13, further comprising the step of transmitting with said combined spread signal an indication of said first and second orthogonal function sequences, said first and second rates and the amount of data transmitted at each of said first and second rates.

17. A receiver for receiving a spread spectrum signal at a transmission rate in a communication system comprising:
   an orthogonal function decoder that combines said received spread spectrum signal with at least a first and a second orthogonal function sequence to produce a combined digital signal, wherein said first orthogonal function sequence produces a first digital signal at a first rate and said second orthogonal function sequence produces a second digital signal at a second rate different from said first rate, wherein said transmission rate is between said first rate and said second rate; and
   a processor for detecting a data signal in said combined digital signal.

18. The receiver according to claim 17, wherein said orthogonal function decoder converts the rate of said data signal to said first and second rates.

19. The receiver according to claim 17, wherein said orthogonal function decoder includes a rate converter for buffering and reclocking said data signal and time multiplexing said first and second orthogonal function sequences corresponding to said first and second rates.

20. The receiver according to claim 17, further comprising means for receiving with said spread spectrum signals an indication of said first and second orthogonal function sequences, said first and second rates and the amount of data transmitted at each of said first and second rates.

21. A method of transmitting spread spectrum signals at a desired rate in a communication system, said method comprising the steps of:

encoding a data signal with at least a first and a second orthogonal function sequence to form a combined spread signal, wherein said first orthogonal function produces a first spread signal at a first rate and said second orthogonal function produces a second spread signal at a second rate different from said first rate;

combining said first and second spread signal to produce a combined spread signal having a data rate between said first and second rates; and determining the proportion of data in said combined spread signal at said first and second rates.

22. The method according to claim 21, wherein said determining step further comprises the step of solving the following equation to determine the number of symbols, $N_L$, to transmit at said first rate, $R_L$, and the number of symbols, $N_L$, to transmit at said second rate, $R_U$, in order to achieve said desired rate, $R_{final}$:

$$R_{final} = \left(\frac{R_L R_U (N_L + N_U)}{N_L R_U + N_U R_L}\right) R$$

where R is a nominal data rate of said communication system.

23. A method of transmitting spread spectrum signals in a communication system, said method comprising the steps of:

encoding a data signal with a first and a second orthogonal function sequence to form a multiplexed spread signal, wherein said first orthogonal function produces a first spread signal at a first rate and said second orthogonal function produces a second spread signal at a second rate different from said first rate; and time multiplexing said first and second spread signal to produce said multiplexed spread signal having a data rate between said first and second rates.

24. The method according to claim 23, wherein said time multiplexing step maintains said orthogonality.

25. A method of transmitting spread spectrum signals in a communication system, said method comprising the steps of:

encoding a data signal with a first and a second orthogonal function sequence to form a combined spread signal, wherein said first orthogonal function produces a first spread signal at a first rate and said second orthogonal function produces a second spread signal at a second rate different from said first rate; and combining said first and second spread signal to achieve a combined spread signal having a data rate that is a rational scale factor combination of said first and second rates.

* * * * *